(12) United States Patent
Burke et al.

(10) Patent No.: US 6,588,807 B1
(45) Date of Patent: Jul. 8, 2003

(54) QUICK CONNECTOR FOR FLUID HANDLING

(75) Inventors: David H. Burke, Flint, MI (US); Robert L. Farrar, Flint, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/153,988

(22) Filed: May 23, 2002

(51) Int. Cl.⁷ ................................................ F16L 37/00
(52) U.S. Cl. ............................ 285/306; 285/1; 285/83; 285/318
(58) Field of Search .................... 285/1, 2, 82, 83, 285/84, 305, 306, 318, 345

(56) References Cited

U.S. PATENT DOCUMENTS

| | | | |
|---|---|---|---|
| 3,800,674 A | * 4/1974 | Sember et al. ............... 92/48 |
| 3,934,315 A | * 1/1976 | Millheiser et al. ............ 24/453 |
| 4,083,585 A | * 4/1978 | Helm ........................ 285/260 |
| 4,099,748 A | * 7/1978 | Kavick ...................... 285/256 |
| 4,163,573 A | * 8/1979 | Yano ...................... 285/148.13 |
| 4,640,535 A | * 2/1987 | Hermann ................ 285/148.14 |
| 5,275,443 A | * 1/1994 | Klinger ....................... 285/82 |
| 5,366,259 A | * 11/1994 | Hohmann et al. .......... 285/305 |
| 5,492,371 A | * 2/1996 | Szabo ......................... 285/23 |
| 5,593,187 A | * 1/1997 | Okuda et al. .............. 285/305 |
| 5,695,221 A | * 12/1997 | Sunderhaus ................... 285/1 |
| 5,718,459 A | * 2/1998 | Davie et al. ............. 285/148.19 |
| 6,179,514 B1 | * 1/2001 | Cheng ........................ 403/377 |
| 6,478,342 B1 | * 11/2002 | Berfield ..................... 285/276 |
| 6,488,320 B1 | * 12/2002 | Anderson ................... 285/319 |

FOREIGN PATENT DOCUMENTS

| DE | 30 29 454 A1 | * 3/1982 | ............. 285/318 |
| FR | 2 515 306 | * 4/1983 | ............. 285/318 |

* cited by examiner

*Primary Examiner*—Lynne H. Browne
*Assistant Examiner*—James M. Hewitt
(74) *Attorney, Agent, or Firm*—Vincent A. Cichosz

(57) ABSTRACT

An improved quick-disconnect connector assembly for connecting hoses, having a female element for connection to a first hose and a male element for connection to a second hose. The female element has an axial bore having a sealing mechanism for sealably receiving a tubular portion of the male element. The male element further comprises resettable valve including a coil spring that extends into the bore in the female element and is retained therein by a U-shaped clip. The spring is sized to hold the male element axially within the sealing mechanism up to a desired inline pressure. When the pressure limit is exceeded, the male element spring is extended until the seal is broken, relieving the overpressure condition. When the un-sealing force has been relieved, the extended spring biases the male element back into sealing relationship with the female element, thereby automatically resetting the relief valve.

5 Claims, 2 Drawing Sheets

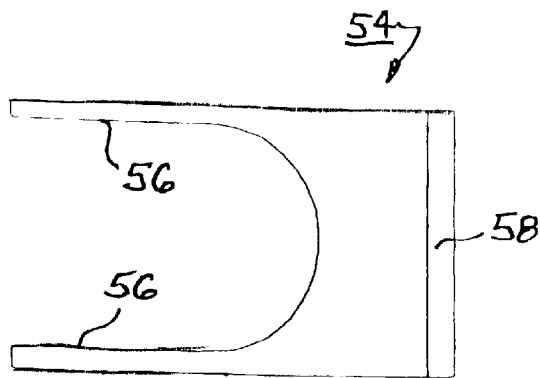
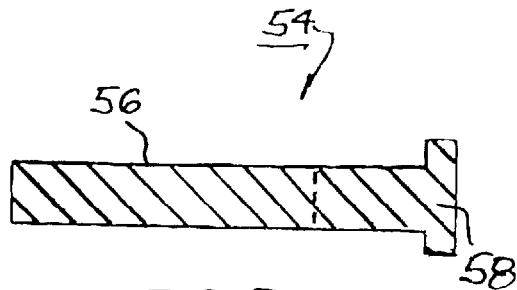
FIG. 2   FIG. 3
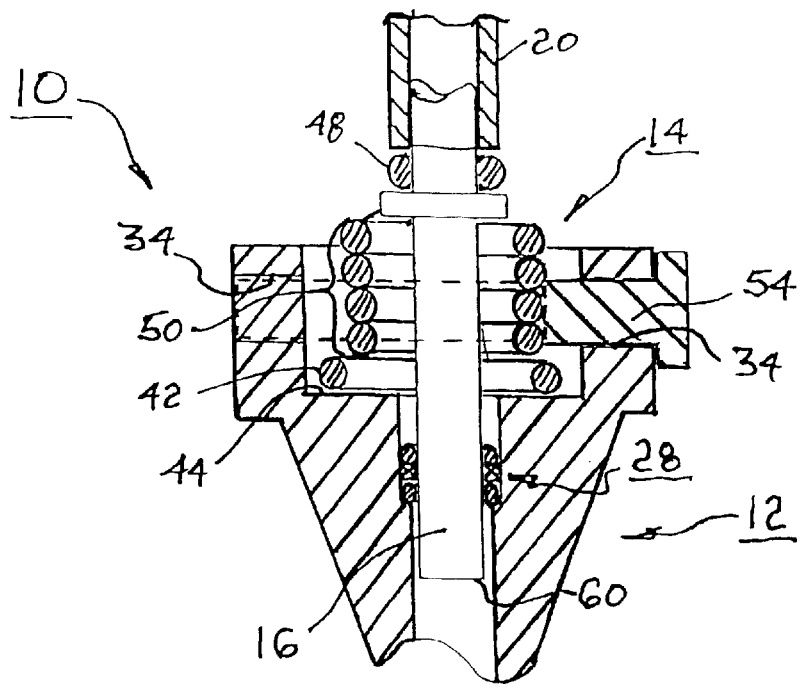
FIG. 4

QUICK CONNECTOR FOR FLUID HANDLING

TECHNICAL FIELD

The present invention relates to an apparatus for connecting hoses for transmission of fluids; more particularly, to so-called "quick-connect" connectors wherein a female element grasps and retains a male element to effect a seal therebetween without resort to screw-type loading; and most particularly, to a male/female quick-connect connector including a self-resetting overpressure relief valve.

BACKGROUND OF THE INVENTION

Connector means for coupling two hoses, or a hose to a bulkhead fitting, are well known. Some such applications benefit from conventional screw-type couplings wherein a female nut on a first coupling element engages a male threaded portion on a second coupling element to draw together mating surfaces therebetween. Such couplings, however, may not be readily connected and disconnected, and may require the cumbersome use of wrenches or other tools. In some other applications, however, it can be highly desirable to employ quick-connect type couplings which can be connected and disconnected manually, quickly, and easily, without tools and without threaded elements.

In one such prior art commercially-available quick-connect connector, a female coupling element is connectable to a first hose and has an axial bore having seal means such as O-rings disposed therein. A tubular male coupling element is connectable to a second hose and has an extension for entering the female axial bore and being sealed therein by the seal means (see SAE Specification J2044). The female element is further provided with a retaining ring containing a plurality of balls which are radially movable and with an axially biased outer sleeve having a tapered inner surface. The male element is further provided with a circumferential ridge and groove for receiving the balls when the two elements are mated. The axially biased sleeve may be manually retracted to permit the balls to move radially outward while passing axially over the ridge to a position adjacent the groove. When released, the sleeve returns axially to a rest position, the tapered inner surface urging the balls radially inward into the groove behind the ridge, and retaining them there, thus coupling the female element onto the male element.

A shortcoming of such a prior art connector in some applications is that the connector maintains the connection at all working pressures to which the application may be subjected. Thus, a hose and coupling system, if subjected to unanticipated overpressure conditions, can fail explosively as by rupture of one of the hoses. Such failure can be anticipated to some extent by installation of a rupture disk in a line fitting, but such a disk cannot reset itself after failure, requiring shutdown of the system, probable drainage thereof, and replacement of the rupture disk. Alternatively, an overpressure valve may be substituted for a rupture disk, which valve may or may not be self-resetting after opening to accommodate an overpressure incident. In either case, an additional valve adds an additional piece of hardware to a hydraulic system and represents an additional possible leak point.

In a specific automotive application, overpressure in a fuel line may result in rupture of the fuel line, presenting a fire hazard if the rupture is external to the fuel tank. In an automotive fuel system, it is desireable to maintain fuel in the feed line when the vehicle is parked so that the engine is easily restarted. In the prior art, a pressure regulator in the feed line prevents overpressurization thereof by regulating the action of the fuel pump, which typically is disposed within the fuel tank. If the regulator fails in a closed position, or the fuel line becomes plugged, then a relief valve incorporated in the fuel pump can prevent overpressure as long as the engine is running. However, when the engine is off and the pump is not energized, residual engine heat can cause the fuel in the feed line to expand. If an additional relief valve is installed in the feed line within the fuel tank but external to the pump, than any leakage in the valve will cause the line to drain into the tank when the engine is shut off, resulting in difficulty in restarting the engine.

What is needed is a connector for a feed line which is readily and positively connected and disconnected, preferably without resort to tools, and which includes relief valve means which is automatically resetting after an overpressure condition is passed.

It is a principal object of this invention to provide improved means for easily coupling two hoses while simultaneously providing automatically resettable relief valve means for relieving an overpressure condition in the hoses.

SUMMARY OF THE INVENTION

Briefly described, the present invention is directed to an improved quick-disconnect connector having a female element for connection to a first hose and a male connector for connection to a second hose. As in the prior art, the female element has an axial bore for sealably receiving a tubular portion of the male element. The male element further includes a coil spring that extends into the female element and is attached thereto by a U-shaped clip. The spring is sized to hold the male element axially within the male/female seal means up to a desired inline pressure. When the desired pressure limit is exceeded, the male element is forced axially of the female element until the male/female seal is broken, thereby relieving the overpressure condition. The spring is extended during this action, and when the un-sealing force is relieved the male element is biased back into sealing relationship with the female element, thereby automatically resetting the relief valve means.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which:

FIG. 2 is a plan view of a retaining clip for retaining the male element in the female element shown in FIG. 1;

FIG. 3 is an elevational cross-sectional view of the clip shown in FIG. 2; and

FIG. 4 is an elevational cross-sectional view of the connector shown in FIG. 1, assembled with the clip shown in FIGS. 2 and 3, ready for service.

DESCRIPTION OF THE PREFERRED EMBODIMENTS

Figure 1:
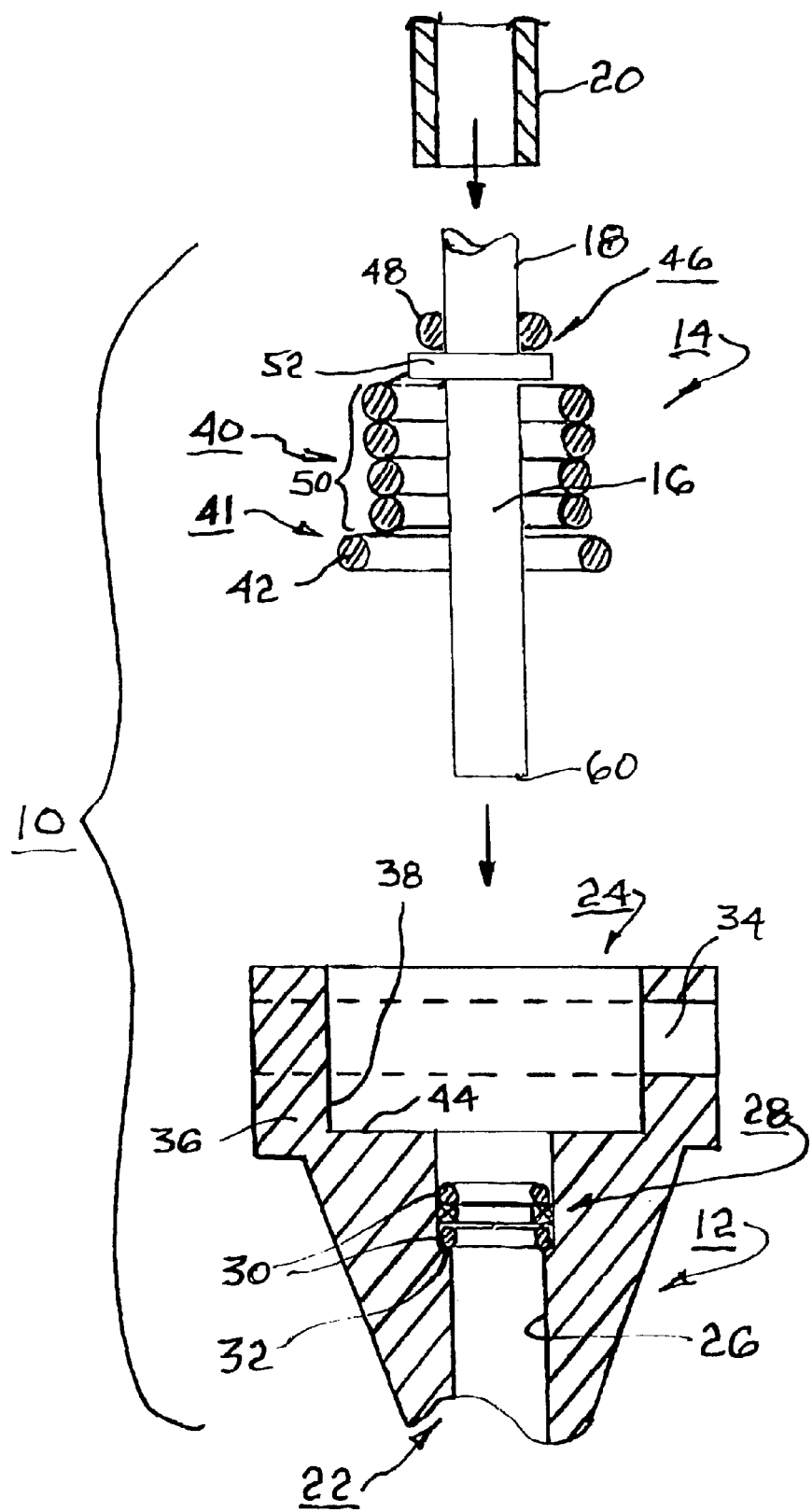
FIG. 1 is an exploded view, partially in cross-section, of male and female elements of a quick connector for fluid handling having an automatically resetting overpressure relief valve.

Referring to FIG. 1, a first embodiment 10 of a connector assembly for connecting two fluid conduits in accordance with the invention includes a female element 12 and a male element 14, which embodiment may be disposed for use in, for example, an automotive vehicle. Male element 14 includes a tubular portion 16 having a nipple end 18 for engaging a first conduit such as hose 20 to be sealingly connected thereto by any of several conventional clamping means. Female element 12 is similarly provided at an inlet end 22 with nipple means for engaging a second conduit such as a hose, which nipple means and second hose are not shown for brevity of presentation. Of course, either or both of elements 12,14 may be equally well adapted within the scope of the invention for engaging a bulkhead port in known fashion rather than a hose per se. Female element 12 has a stepped bore 24 for receiving tubular portion 16 in a smaller-diameter inner portion 26 thereof. Annular seal means 28, for example, O-rings 30 supported on a step 32, is provided in bore 26. A pair of transverse slots 34 are formed in the body 36 of female element 12 and pass through the larger-diameter portion 38 of stepped bore 24. Male element 14 includes a spring means 40 surrounding tubular portion 16 and has first retaining means 41 whereby male element is to be retained in female element 12, preferably a larger-diameter spring coil 42 of spring 40, or a comparable flange, for insertion into bore 38 when the male element is to be coupled into the female element and for coming to rest against step 44. Spring means 40 further includes second retaining means 46 preferably comprising an additional turn 48 of spring 40 offspaced from the central turns 50 to accommodate a spring retainer 52 therebetween. Retainer 52 is attached to portion 16 and may be formed, for example, as a partial flange or a transverse pin. Retainer 52 secures spring means 40 to portion 16.

Referring to FIGS. 2 and 3, a retaining clip 54 is generally U-shaped having first and second legs 56 and a handle portion 58 for connecting and spacing the legs. Legs 56 are spaced apart by a distance greated than the diameter of coils 50 but less than the diameter of coil 42.

Referring to FIG. 4, in the assembled connector, first hose 20 is attached to nipple portion 18. Male tubular member 16 is inserted into bore 26 through seal means 28 to effect a liquid seal of male member 14 to female member 12. Spring means 40 is disposed partially within bore 38, coil 42 being engaged with step 44 to limit ingress of member 14 into member 12. To retain member 14 sealingly in member 12, clip 54 is inserted into slots 34. Legs 56 pass around middle coils 50 and, being closer together than the diameter of coil 42, capture spring means 40, and therefore male member 14, within female member 12.

Spring means 40 is sized to retain portion 16 within seal means 28 over a predetermined range of inline pressures. As inline pressure varies within this range, portion 16 may be displaced axially of female member 12 without disturbing the seal formed with seal means 28. As inline pressure increases, spring means 40 becomes increasingly extended between first retaining coil 42 and second retaining coil 48. When the predetermined inline pressure limit is exceeded, the distal end 60 of portion 16 is forced from seal means 28, breaking the seal and releasing fluid, thereby reducing the inline pressure. When the overpressure event is terminated, the biasing force created in extended spring means 40 causes portion 16 to automatically re-enter seal means 28, thereby re-establishing a leak-free connection between the male and female members. The connector 10 may be easily disassembled without tools simply by removing clip 54 from slots 34.

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention. Therefore, it is intended that the invention not be limited to the particular embodiments disclosed as the best mode contemplated for carrying out this invention, but that the invention include all embodiments falling within the scope and spirit of the appended claims.

What is claimed is:

1. A connector assembly for connecting first and second fluid conduits, comprising:

a) a female element for attachment to a first fluid conduit, said female element having a stepped axial bore an axial bore having a step, said bore containing a sealing means and having at least one slot intersecting said bore;

b) a male element for attachment to a second fluid conduit, said male element having a tubular portion for extending into said axial bore to sealingly engage said sealing means and having spring means seatable against said step in said bore; and c) retaining means insertable into said slot for engaging said spring at least one means to retain said male element in said female element.

2. A connector assembly in accordance with claim 1 wherein said female element has two parallel slots intersecting said bore and said retaining means is a U-shaped clip.

3. A connector assembly in accordance with claim 1 wherein said spring means is a coil spring disposed coaxially of said tubular portion and includes a plurality of turns having a first diameter and at least one turn having a second and larger diameter for engaging said retaining means.

4. A connector assembly in accordance with claim 3 wherein said coil spring is retained on said male element by a spring retainer disposed between coils of said spring.

5. A connector assembly in accordance with claim 3 wherein said spring is selected to permit said male element to move axially of said female element within said sealing means over a predetermined range of inline pressures within said fluid conduits, and to permit said male element to move axially of said female element beyond said sealing means to relieve pressure when inline pressure exceeds said range.

* * * * *